United States Patent
Kubovsky et al.

(10) Patent No.: US 9,036,648 B2
(45) Date of Patent: May 19, 2015

(54) MESSAGE ATTACHMENT TRACKING

(75) Inventors: Inbal Zilberman Kubovsky, Givat Schmuel (IL); Guy Soffer, Ra'anana (IL)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 13/181,980

(22) Filed: Jul. 13, 2011

(65) Prior Publication Data
US 2013/0018966 A1 Jan. 17, 2013

(51) Int. Cl.
*H04L 12/28* (2006.01)
*G06Q 10/10* (2012.01)
*H04L 12/58* (2006.01)

(52) U.S. Cl.
CPC .............. *G06Q 10/107* (2013.01); *H04L 51/34* (2013.01); *H04L 51/08* (2013.01)

(58) Field of Classification Search
CPC . H04L 49/30; H04L 2012/5679; H04L 47/52; H04L 12/2872
USPC .................................. 370/419, 401, 412, 463
See application file for complete search history.

(56) References Cited

U.S. PATENT DOCUMENTS

| | | | |
|---|---|---|---|
| 5,960,409 A * | 9/1999 | Wexler | 705/14.41 |
| 7,296,058 B2 | 11/2007 | Throop | |
| 2002/0091782 A1* | 7/2002 | Benninghoff, III | 709/206 |
| 2003/0117664 A1* | 6/2003 | McCarthy, Jr. | 358/402 |
| 2005/0108336 A1* | 5/2005 | Naick et al. | 709/206 |
| 2005/0108435 A1* | 5/2005 | Nowacki et al. | 709/246 |
| 2005/0257159 A1* | 11/2005 | Keohane et al. | 715/752 |
| 2006/0212286 A1* | 9/2006 | Pearson et al. | 704/9 |
| 2007/0005717 A1* | 1/2007 | LeVasseur et al. | 709/206 |
| 2007/0180035 A1* | 8/2007 | Liu et al. | 709/206 |
| 2009/0210502 A1* | 8/2009 | Ocampo | 709/206 |
| 2010/0198864 A1* | 8/2010 | Ravid et al. | 707/769 |
| 2011/0270885 A1* | 11/2011 | Vieira et al. | 707/785 |

* cited by examiner

*Primary Examiner* — Hassan Phillips
*Assistant Examiner* — Siren Wei
(74) *Attorney, Agent, or Firm* — Fish & Richardson P.C.

(57) ABSTRACT

The present disclosure involves systems, software, and computer implemented methods for tracking files attached to electronic messages. One process includes operations for receiving a message, the message including information to be displayed by a message reading application, the message including a first indication that a file was attached to the earlier message, wherein the first indication is marked to not be displayed with the information by the message reading application; determining that the file is not attached to the message; sending a request for the file to a user identifier, the user identifier being included in the message and associated with the file or the earlier message or both; and receiving the file.

22 Claims, 4 Drawing Sheets

MESSAGE ATTACHMENT TRACKING

TECHNICAL FIELD

The present disclosure relates to software, computer systems, and computer implemented methods for tracking files attached to electronic messages.

BACKGROUND

Conventional email applications allow users to attach files (e.g., word processing documents, images, audio files, and so on) to emails. Users who receive an email with an attached file can then reply to that email or forward that email to other users in a new email. Typically, when a user forwards an email having an attached file, the user's email application attaches the file to the new email; however, when a user replies to an email having an attached file, the user's email application does not attach the file to the new email. Users can also manually remove an attached file from the new email. Consequently, other users who receive the new email can receive text from the original email but not the attached file. In some cases, those users will be able to determine that the original email had an attached file, for example, by seeing indicators of missing files (e.g., "<< >>"), or by seeing references in the text to a file. If any of those users wants the file, he will have to read the new email to determine who might have the file and send email to someone requesting the file. The person receiving the request will then have to find the file and send another email with the file.

SUMMARY

The present disclosure describes techniques for tracking files attached to electronic messages. A computer program product is encoded on a tangible storage medium, where the product comprises computer readable instructions for causing one or more computers to perform operations.

These operations can include receiving a message, the message including information to be displayed by a message reading application, the message including a first indication that a file was attached to the earlier message, wherein the first indication is marked to not be displayed with the information by the message reading application; determining that the file is not attached to the message; sending a request for the file to a user identifier, the user identifier being included in the message and associated with the file or the earlier message or both; and receiving the file. The operations can optionally include one or more of the following features. The message includes a second indication that the message is a forward or a reply to an earlier message. The operations include, in response to determining that the file is not attached to the message, presenting a prompt for a user to request the file; and receiving input from the user to request the file. The request includes one or more of the following items of information: a reference to the earlier message, descriptive information of the file, a sender identifier for a sender of the earlier message, and an indication of whether or not the earlier message was marked confidential. The items of information are included in the request to be displayed by the message reading application. The request includes one or more of the following items of information: the attachment display name for the file, and an attachment mail identifier for the earlier message.

These operations can include determining that a message has an attached file, the message including information to be displayed by a message reading application, the message being marked as sent from a user identifier; adding to the message an indication that the file is attached to the message, wherein the indication is marked to not be displayed by the message reading application, and wherein the indication includes the user identifier and associates the user identifier with the file or the message or both; and sending the message. The operations can optionally include one or more of the following features. The indication includes one or more of: an attachment display name, and attachment file name, an attachment size, and an attachment mail identifier. The operations include receiving a request for the file; and providing the file in response to the request. The operations include incrementing a counter in response to receiving the request for the file.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
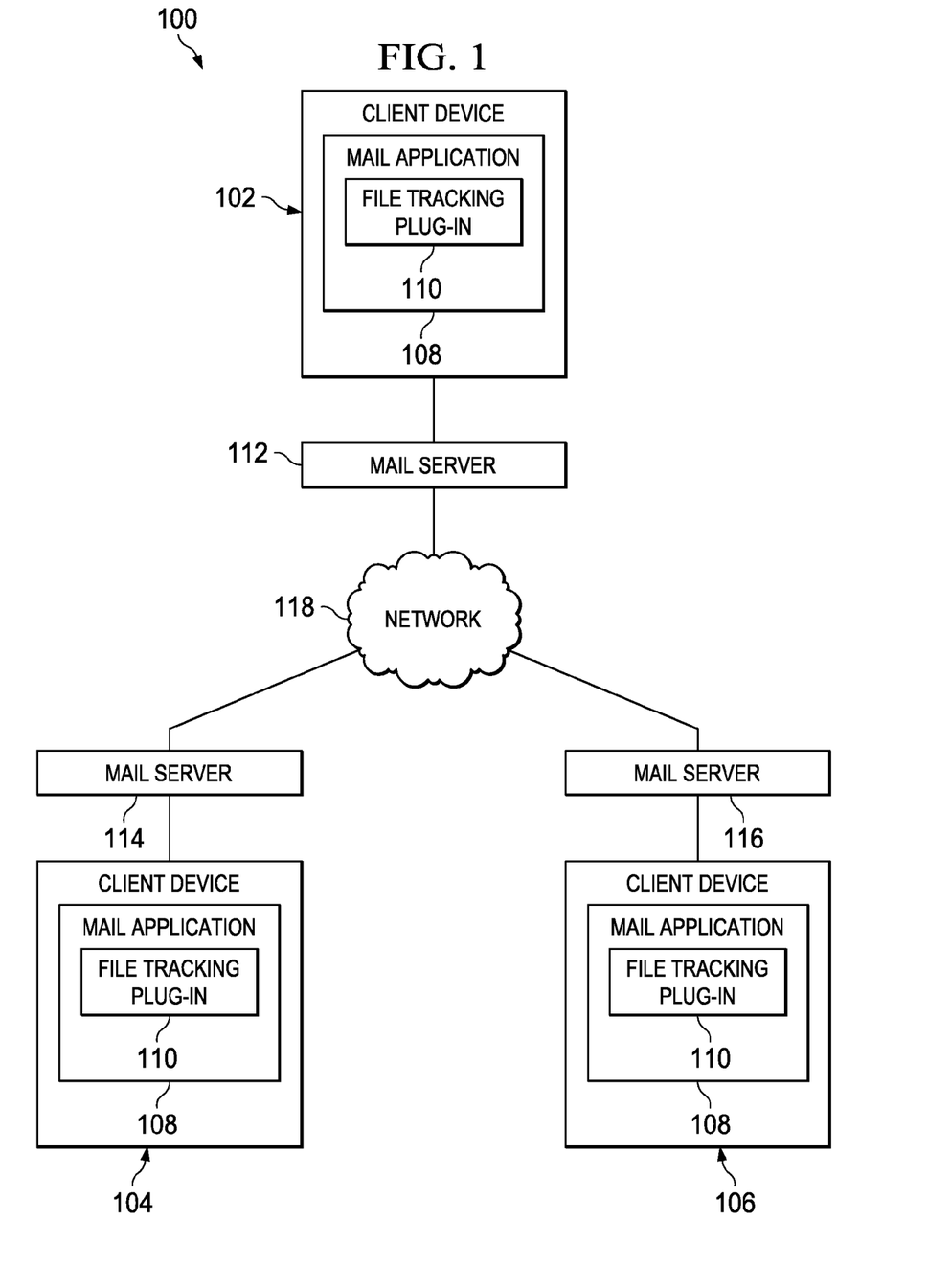
FIG. 1 illustrates an example environment for tracking files attached to messages.

FIG. 1 illustrates an example environment 100 for tracking files attached to messages. The messages are described as being emails; however, the techniques described in this document can apply to any type of electronic messages.

The example environment 100 includes three different client devices 102, 104, and 106. Each client device is a system one or more computers configured to execute a mail application 108. The mail application 108 includes a file tracking plug-in 110. The client devices 102, 104, and 106 send email to each other using mail servers 112, 114, and 116 and the network 118. Each mail server is a system of one or more computers configured to route email. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The network 118 is a computer network, e.g., the Internet.

The mail application 108 performs various email tasks, e.g., sending and receiving emails, displaying received emails, composing outgoing emails, sorting and organizing emails, managing contacts and their email addresses, and so on. The mail application 108 can attach files to outgoing emails, reply-to received emails, and forward received emails. Emails created by the mail application 108 can include information to be displayed by the mail application 108 (e.g., text for a user to read) and information marked to not be displayed the mail application 108 (e.g., hidden or meta information). A typical user who reads an email with information marked to not be displayed will not see that information without further action.

Although the client devices 102, 104, and 106 are shown as having the same mail application 108, the client devices 102, 104, and 106 can all run different mail applications (e.g., from different software vendors, or for operating systems). The mail application 108 can run locally on a client device, and the mail application 108 can be a web based application, e.g., where a client device executes JavaScript in a web browser and a mail server stores related information, e.g., archived emails and lists of contacts.

The file tracking plug-in 110 performs tasks for tracking files attached to emails. When the mail application 108 sends an outgoing email with a file attached, the file tracking plug-in 110 can add an indication regarding the file to the outgoing email and mark the indication to not be displayed by the mail application. The indication can include various information regarding the file, e.g., a file name and a user identifier of the sender of the outgoing email (e.g., the sender's email address) and a mail identifier (e.g., an entry ID) for the outgoing email. When the mail application 108 receives an incoming email with an indication of a file but not having the file attached, the file tracking plug-in 110 can send a request for the file to a user identifier in the incoming email.

The various tasks that can be performed by the file tracking plug-in 110 are described in further detail below. Although the file tracking plug-in 110 is described as being a plug-in to the mail application 108, the functionality of the file tracking plug-in 110 can be included in the mail application 108 so that a plug-in is not necessary. For mail applications that do not support file tracking as described in this document, the functionality of the file tracking plug-in can 110 be added by installing a plug-in to those mail applications. Alternatively, the some or all of the tasks performed by the file tracking plug-in 110 can be performed by a mail server. For example, a mail server can add indications regarding files to all outgoing emails having attached files. As another example, a mail server can search incoming emails to find emails including an indication of an attached file but lacking the file and send requests for files to user identifiers in those emails.

Figure 2:
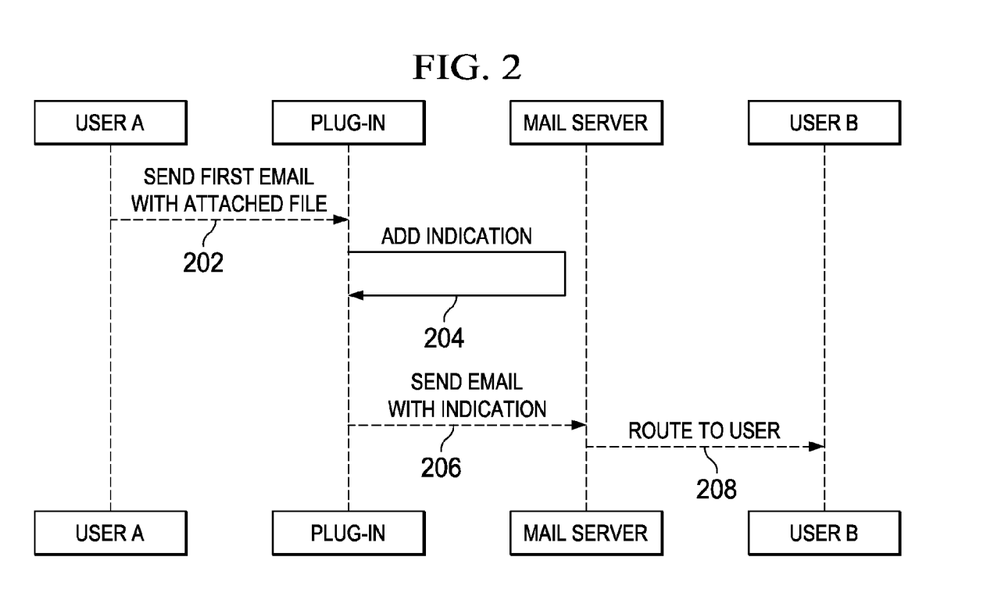
FIGS. 2 and 3 illustrate an example scenario that demonstrates message attachment tracking.
Figure 3:
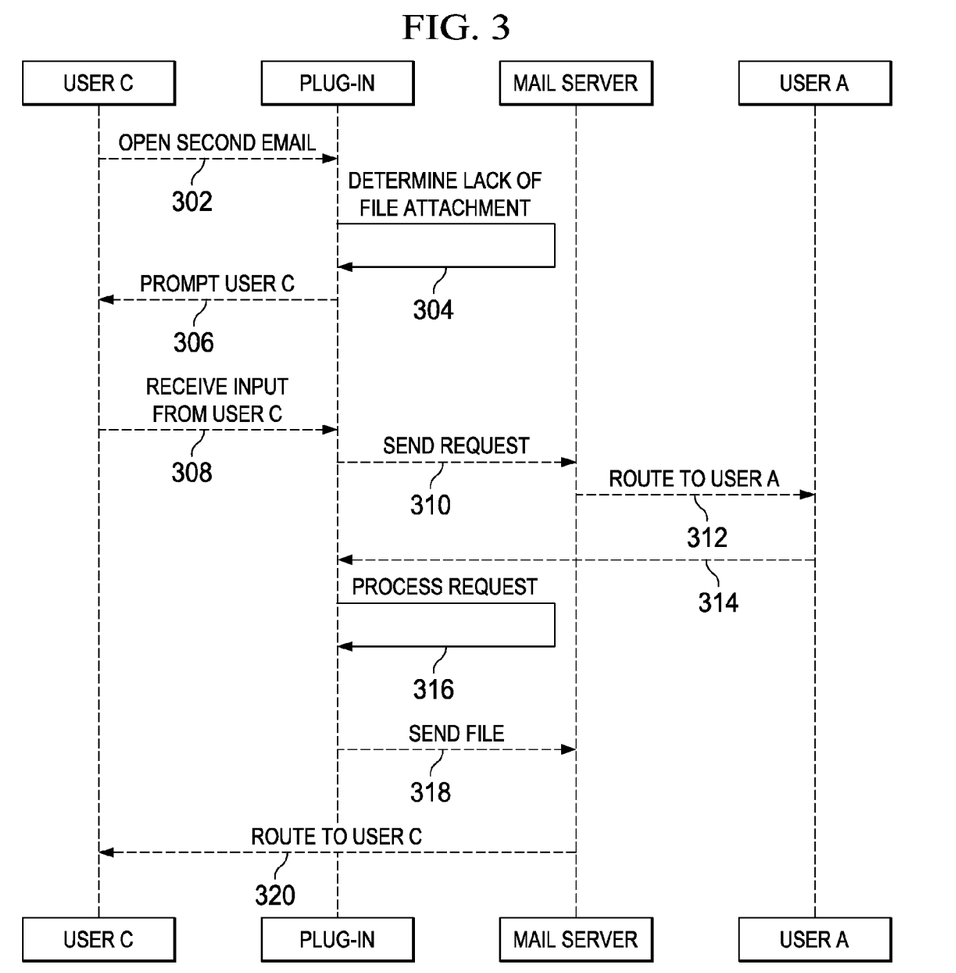

FIGS. 2 and 3 illustrate an example scenario that demonstrates message attachment tracking. In the example scenario, three users correspond by email, User A, User B, and User C. The users can be, for example, using the client devices 102, 104, and 106 of FIG. 1, which are configured with the mail application 108 and file tracking plug-in 110 of FIG. 1, and which send and receive email using one or more of the mail servers 112, 114, and 116 of FIG. 1.

Referring to FIG. 2, the scenario begins in a step 202 with User A sending a first email having a file attached. The first email is addressed for User B. In the next step 204, a file tracking plug-in for User A determines that the first email has a file attached and adds an indication that the file is attached. The indication is marked to not be displayed by a mail application. The indication can be, e.g., metadata attached to the first email and accessible to a mail application but hidden from an end-user. The indication also includes a user identifier for User A, e.g., User A's email address. In a next step 206, the file tracking plug-in sends the first email with the added indication (this step can be completed using, or in coordination with, a mail application for User A). A mail server routes the first email to User B. User B thus receives the first email and the file attached to the email.

The scenario continues with User B sending a second email that is a reply to the first email. The second email adds User C as a recipient (e.g., in addition to User A, or instead of User A). The second email does not have the file attached to it. This can be because, for example, User B's mail application is configured to not attach files to reply-to emails, or because User B manually instructs the mail application to not attach the file to the second email. However, the second email includes the indication regarding the file from the first email, and the indication is still marked to not be displayed by a mail application. The second email can also include an indication that the second email is a reply-to the first email. That indication can be, e.g., the word "RE" in the subject line or a body of text of the second email.

Referring to FIG. 3, the scenario continues at a step 302 where User C opens the second email, e.g., to read the second email. At a next step 304, which occurs, e.g., while User C's client device is displaying information in the second email, User C's plug-in determines that the second email includes the indication regarding the file, but that the second email does not have the file attached to it. User C does not see the indication because it is marked to not be displayed. Instead, User C sees information formatted to be displayed by his mail application, e.g., quoted text from the first email and additional text added by User B to the second email.

At a next step 306, the plug-in presents a prompt to User C. The prompt is, e.g., a dialog box or notification bubble indicating that the second email is associated with a file that is not attached to the second email. The prompt can include various other information regarding the file as described further below with respect to FIG. 5. At a next step 308, the plug-in receives input from User C to request the file (e.g., User C clicks a button marked "retrieve file.") If there are multiple files indicated but not attached, the plug-in can present a list of files and allow User C to select which files to request. At a next step 310 the plug-in sends a request for the file to a user identifier for User A. User A's user identifier was added to the first email and then included in the second email because the second email was a reply to the first email. The mail server, at a next step 312, routes the request to User A. User A's plug-in processes the request. For example, the plug-in can locate the file and prompt User A to for permission to send the file to User C, or take other actions. User A's plug-in, at a next step 318, sends the requested file, e.g., by attaching it to an email addressed to User C. In a next step 320, a mail server routes the requested file to User C. Although in this example the plug-in presents a prompt, the plug-in can also be configured to automatically retrieve attachments without user interaction.

Figure 4:
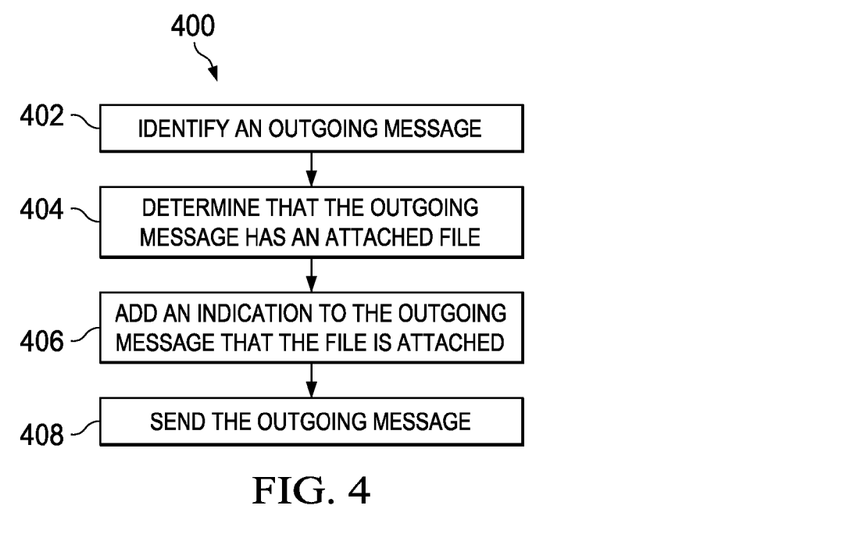
FIG. 4 is a flow diagram of an example process for sending messages so that attached files can be tracked.

FIG. 4 is a flow diagram of an example process 400 for sending messages so that attached files can be tracked. The process 400 is performed by a system of one or more computers. For example, the process can be performed by a client device, a mail server, or a client device and a mail server.

The system identifies an outgoing message (step 402). Typically, the message is an email composed by a user. The system identifies the message, for example, when the user sends the email. The message includes information (e.g., text) to be displayed by message reading application (e.g., a mail application). The message is marked as being sent from a user identifier. For example, the message can have a "from" field including the composing user's name and email address.

The system determines that the outgoing message has an attached file (step 404). For example, the user who composed the message can attach the file, or the user's mail application can attach the file without a specific instruction from the user (e.g., when the user forwards another message with an attachment). The file can be attached to the message in various ways, depending on the type of message and formatting of the message, but email attachments are a typical example. The file can be, for example, a word processing document, an image, an audio file, or any other type of digital information.

The system adds an indication to the outgoing message that the file is attached (step 406). The indication is marked to not be displayed by the message reading application. For example, the indication can be marked as meta information, or placed into a message field marked for hidden information. The indication is included with the message so that it will be copied over if the message is forwarded or replied to by a typical mail application. The indication associates the user identifier with the file or the outgoing message or both. For example, the indication can include the user identifier (as described in the next paragraph). In another example, the indication can include a special field for the user identifier indicating that, for example, the user identifier is for an author or creator of the file (e.g., as indicated by the file itself), or the user identifier is for an original sender of the file (e.g., when the outgoing message is a forward or a reply to an earlier message).

In some implementations, the indication includes one or more of the following items of information: an attachment display name (e.g., the display name of the file for the message reading application), an attachment file name (e.g., the file name including any extension indicating a file type), an attachment size (e.g., the size of the file in bytes), an attachment mail identifier (e.g., an EntryID of the outgoing message), and an attachment sender user identification (e.g., the sending user's email address, taken from a "from" field of the message).

The indication can be represented in various ways. In some implementations, the indication is represented using XML. For example, the indication, in XML schema, can look like this:

```
<attachments retrieval info>
    <attachment>
        <displayName>wordDoc.docx</displayName>
        <mailID>DFRERFRTG</mailID>
        <senderEmail>inbal.zilberman@sap.com</senderEmail>
    </attachment>
</attachments retrieval info>
```

The system sends the outgoing message (step 408). If the recipient forwards or replies to that message with a new message, and does not attach the file to the new message, new users can request the file from the system, as described further below with reference to FIG. 5. In that case, the system receives a request for the file and provides the file in response to the request. For example, the request can be an email message with all of the information from the indication added to the outgoing message. In another example, the missing file can be attached to the outgoing message, which is then re-sent with the file attached.

In some implementations, the system prompts a user for approval to send the file. In some implementations, the system checks the file or the information in the request to determine whether the file is marked as confidential. For example, the system can determine to not send the file if the file is marked as confidential, or the system can determine to prompt a user if the file is marked as confidential. The sender of the outgoing message can mark the file as confidential, for example, when that user attaches the file to the outgoing message.

In some implementations, the system maintains attachment statistics for the file attached to the outgoing message. The statistics can be maintained, for example, with a copy of the outgoing message stored in the original sender's messaging account, even though the outgoing message has already been sent. The attachment statistics include, for example, the number of requests for a file (which the system tracks by incrementing a counter for every received request), and an attachment read number for the number of receivers who have opened the attached file (which the system tracks by incrementing a counter when the system receives a notification that the attached file has been opened).

Figure 5:
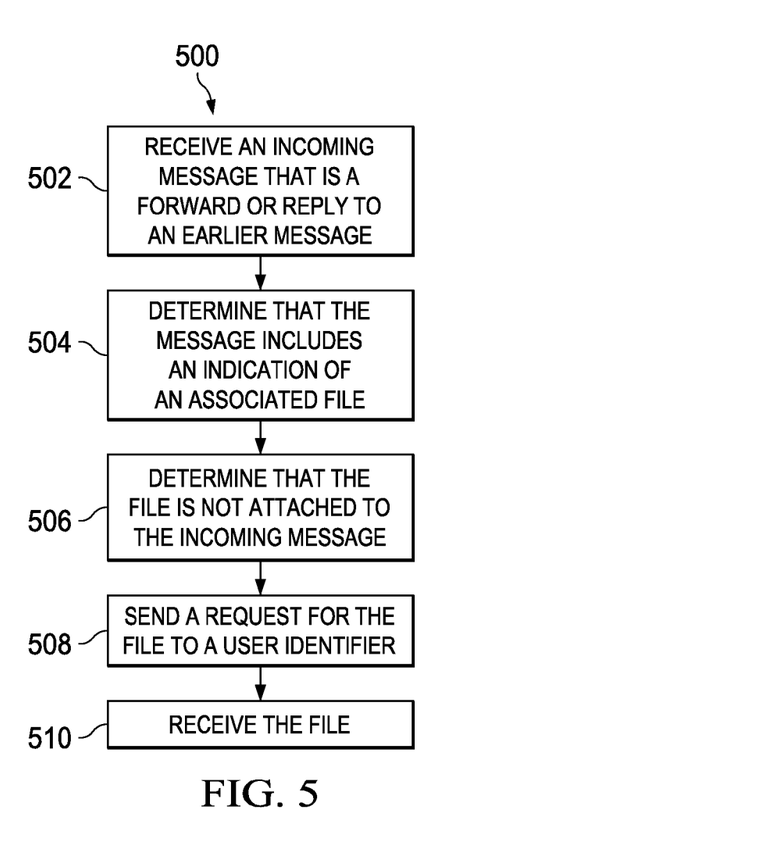
FIG. 5 is a flow diagram of an example process for receiving messages and tracking files.

FIG. 5 is a flow diagram of an example process 500 for receiving messages and tracking files. The process 500 is performed by a system of one or more computers. For example, the process can be performed by a client device, a mail server, or a client device and a mail server.

The system receives an incoming message (step 502). The incoming message can, but need not, include an indication that the message is a forward or a reply to an earlier message. For example, the indication can be a phrase in a subject line of the incoming message, e.g., "re" or "fwd." In another example, the indication is quoted text within the body of the message.

The system determines that the incoming message includes an indication that a file was attached to the earlier message (step 504). The indication was added to the earlier message, e.g., as described above in reference to FIG. 3, and then copied to the incoming message because the incoming message is a forward or a reply to the earlier message. The indication is marked to not be displayed by a message reading application. The system determines that the file is not attached to the incoming message (step 506).

The system sends a request for the file to a user identifier (step 508). In some implementations, the system prompts a user to determine whether to request the file or not, and then receives input from the user to request the file. If there are indications of multiple files that are not attached to the incoming message, the system can prompt the user to determine which files to request, and then send separate requests for each file or send a single request for all the files.

The request can be, for example, an email addressed to the user identifier. In some implementations, the request includes one or more of the following items of information: a reference to the earlier message (e.g., a hyperlink), descriptive information of the file (e.g., file name, file size), an indication of whether or not the earlier message was marked confidential, and so on. Those items of information can be included in the request so that a message reading application will display them. In some implementations, the request includes one or more of the following items of information: the attachment display name for the file, and an attachment mail identifier for the earlier message (e.g., an EntryID). Those items of information can be marked to not be displayed by a message reading application.

The system receives the file (step 510). The file can be received, for example, as an attachment to a message.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method performed by one or more computers, the method comprising the following operations:
   determining that a file is attached to a first message, and in response, adding an indication to the first message to indicate that the file is attached to the first message;
   receiving a second message that is in response to the first message, the second message including information to be displayed by a message reading application, the second message is sent from a first user to at least one or more second users;
   in response to the receiving, copying the indication from the first message to the second message, the indication indicating that the file is attached to the first message, wherein the indication is marked to not be displayed with the information by the message reading application;
   displaying, by the message reading application, the information without displaying the first indication;
   determining, by a file tracking plug-in included in the message reading application, based on the indication, that the second message is associated with the file that is attached to the first message and that the file is not currently attached to the second message;
   in response to determining that the second message is associated with the file that is attached to the first message and that the file is not attached to the second message, and without a user's intervention, presenting, by the file tracking plug-in, a prompt for the user to request the file;
   receiving an input from the user to request the file;
   in response to receiving the input from the user to request the file, sending, by the file tracking plug-in, a request for the file to a user identifier, the user identifier being included in the first message and associated with the file or the first message or both; and
   receiving the file.

2. The method of claim 1, wherein the second message includes an additional indication that the second message is a forward or a reply to the first message.

3. The method of claim 1, wherein the request includes one or more of the following items of information: a reference to the first message, descriptive information of the file, a sender identifier for a sender of the first message, and an additional indication of whether or not the first message was marked confidential.

4. The method of claim 3, wherein the items of information are included in the request to be displayed by the message reading application.

5. The method of claim 1, wherein the request includes one or more of the following items of information: the attachment display name for the file, and an attachment mail identifier for the first message.

6. A method performed by one or more computers, the method comprising the following operations:
   determining, by a file tracking plug-in, that a first message comprises an added indication that a file is attached to the first message, the first message including information to be displayed by a message reading application, the first message being marked as sent from a user identifier;
   generating a second message that is in response to the first message, the second message including information to be displayed by the message reading application, the second message is sent from a first user to at least one or more second users;
in response to determining that the first message has an indication, copying, by the file tracking plug-in, the indication from the first message to the second message, the indication indicating that the file is attached to the first message, wherein the indication is marked, by the file tracking plug-in, to not be displayed by the message reading application, and wherein the indication includes the user identifier and associates the user identifier with the file or the first message or both; and
sending the message.

7. The method of claim 6, wherein the indication includes one or more of: an attachment display name, and attachment file name, an attachment size, and an attachment mail identifier.

8. The method of claim 6, further comprising:
receiving a request for the file; and
providing the file in response to the request.

9. The method of claim 8, further comprising incrementing a counter in response to receiving the request for the file.

10. A non-transitory computer storage medium encoded with a computer program, the program comprising instructions that when executed by one or more computers cause the computers to perform operations comprising:
determining that a file is attached to a first message, and in response, adding an indication to the first message to indicate that the file is attached to the first message;
receiving a second message that is in response to the first message, the second message including information to be displayed by a message reading application, the second message is sent from a first user to at least one or more second users;
in response to the receiving, copying the indication from the first message to the second message, the indication indicating that the file is attached to the first message, wherein the indication is marked to not be displayed with the information by the message reading application;
displaying, by the message reading application, the information without displaying the first indication;
determining, by a file tracking plug-in included in the message reading application, based on the indication, that the second message is associated with the file that is attached to the first message and that the file is not currently attached to the second message;
in response to determining that the second message is associated with the file that is attached to the first message and that the file is not attached to the second message, and without a user's intervention, presenting, by the file tracking plug-in, a prompt for the user to request the file;
receiving an input from the user to request the file;
in response to receiving the input from the user to request the file, sending, by the file tracking plug-in, a request for the file to a user identifier, the user identifier being included in the first message and associated with the file or the first message or both; and
receiving the file.

11. The computer storage medium of claim 10, herein the second message includes an additional indication that the second message is a forward or a reply to the first message.

12. The computer storage medium of claim 10, wherein the request includes one or more of the following items of information: a reference to the first message, descriptive information of the file, a sender identifier for a sender of the first message, and an additional indication of whether or not the first message was marked confidential.

13. The computer storage medium of claim 12, wherein the items of information are included in the request to be displayed by the message reading application.

14. The computer storage medium of claim 10, wherein the request includes one or more of the following items of information: the attachment display name for the file, and an attachment mail identifier for the first message.

15. A non-transitory computer storage medium encoded with a computer program, the program comprising instructions that when executed by one or more computers cause the computers to perform operations comprising:
determining, by a file tracking plug-in, that a first message comprises an added indication that a file is attached to the first message, the first message including information to be displayed by a message reading application, the first message being marked as sent from a user identifier;
generating a second message that is in response to the first message, the second message including information to be displayed by the message reading application, the second message is sent from a first user to at least one or more second users;
in response to determining that the first message has an indication, copying, by the file tracking plug-in, the indication from the first message to the second message, the indication indicating that the file is attached to the first message, wherein the indication is marked, by the file tracking plug-in, to not be displayed by the message reading application, and wherein the indication includes the user identifier and associates the user identifier with the file or the first message or both; and
sending the message.

16. The computer storage medium of claim 15, wherein the indication includes one or more of: an attachment display name, and attachment file name, an attachment size, and an attachment mail identifier.

17. The computer storage medium of claim 15, the operations further comprising:
receiving a request for the file; and
providing the file in response to the request.

18. The computer storage medium of claim 17, the operations further comprising incrementing a counter in response to receiving the request for the file.

19. A system comprising one or more computers configured to perform operations comprising:
determining that a file is attached to a first message, and in response, adding an indication to the first message to indicate that the file is attached to the first message;
receiving a second message that is in response to the first message, the second message including information to be displayed by a message reading application, the second message is sent from a first user to at least one or more second users;
in response to the receiving, copying the indication from the first message to the second message, the indication indicating that the file is attached to the first message, wherein the indication is marked to not be displayed with the information by the message reading application;
displaying, by the message reading application, the information without displaying the first indication;
determining, by a file tracking plug-in included in the message reading application, based on the indication, that the second message is associated with the file that is attached to the first message and that the file is not currently attached to the second message;

in response to determining that the second message is associated with the file that is attached to the first message and that the file is not attached to the second message, and without a user's intervention, presenting, by the file tracking plug-in, a prompt for the user to request the file;

receiving an input from the user to request the file;

in response to receiving the input from the user to request the file, sending, by the file tracking plug-in, a request for the file to a user identifier, the user identifier being included in the first message and associated with the file or the first message or both; and receiving the file.

20. A system comprising one or more computers configured to perform operations comprising:

determining, by a file tracking plug-in, that a first message comprises an added indication that a file is attached to the first message, the first message including information to be displayed by a message reading application, the first message being marked as sent from a user identifier;

generating a second message that is in response to the first message, the second message including information to be displayed by the message reading application, the second message is sent from a first user to at least one or more second users;

in response to determining that the first message has an indication, copying, by the file tracking plug-in, the indication from the first message to the second message, the indication indicating that the file is attached to the first message, wherein the indication is marked, by the file tracking plug-in, to not be displayed by the message reading application, and wherein the indication includes the user identifier and associates the user identifier with the file or the first message or both; and sending the message.

21. The method of claim 8, wherein providing the file in response to the request comprises:

determining, by the file tracking plug-in, that the file in the request is retrievable;

in response to determining that the file is retrievable, and without a user's intervention, presenting, by the file tracking plug-in, a prompt for the user to send the file;

receiving an input from the user to send the file; and in response to receiving the input from the user to send the file, and without the user's intervention, sending the file by attaching the file in an outgoing message.

22. The method of claim 8, wherein providing the file in response to the request comprises:

determining, by the file tracking plug-in, that the file in the request is marked as confidential;

in response to determining that the file is confidential, and without a user's intervention, presenting, by the file tracking plug-in, a prompt for the user to send the file; and sending an outgoing message attached with the file.

\* \* \* \* \*